No. 711,230. Patented Oct. 14, 1902.
F. H. RICHARDS.
PLAYING BALL.
(Application filed June 28, 1902.)
(No Model.)
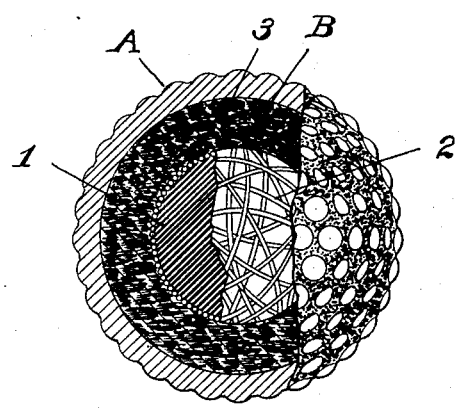
Witnesses:
Inventor:
F. H. Richards.

UNITED STATES PATENT OFFICE.

FRANCIS H. RICHARDS, OF HARTFORD, CONNECTICUT, ASSIGNOR TO THE KEMPSHALL MANUFACTURING COMPANY, A CORPORATION OF NEW JERSEY.

PLAYING-BALL.

SPECIFICATION forming part of Letters Patent No. 711,230, dated October 14, 1902.

Application filed June 28, 1902. Serial No. 113,563. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls, especially those used in the game of golf; and its object is to produce at low cost a ball having exceptional flying power under a hard blow, but inactive under a light blow.

The accompanying drawing shows, partly in section, a ball made in accordance with my improvements.

The interior of the ball preferably comprises a sphere 1, which preferably consists of molded solid rubber. Upon this sphere 1 I flex or bend continuously in miscellaneous directions one or more lengths of tempered-wire spring 2, thereby forming a tense metallic casing or lattice-work, which thus consists of a series of irregularly-arranged tense hoops or convolutions. The wire is preferably flat or oblong in cross-section and wound flatwise upon the rubber sphere 1, and the number of windings may be varied to suit the ball in different games or to give it different qualities. The spring-wire before winding may be substantially straight and flexed or constrained at each winding, thereby making a tension in the wire, so that each hoop or band tends constantly to recover its normal straight condition, and hence every portion of the casing A may be in a state of high initial tension. Moreover, since the wire is wound under great longitudinal tension it holds the sphere 1 under high compression. The structure hence comprises a sphere of soft rubber, which is bound tightly within windings of longitudinally-unyielding wire, said wire itself being highly tensioned by the bending and showing enormous activity when given a heavy blow. Upon this sphere or center piece 1 is applied a sphere 3, formed by granulated substance B, such as cork, mixed with celluloid solution, collodion, or a derivative of pyroxylin. This compound material after hardening is very stiff and springy and has other qualities whereby it is well adapted for a shell or layer in a golf-ball. Moreover, it can be made at such low cost as to reduce materially the expense of making the ball. Upon the ball thus constrained I apply celluloid or other plastic material to form a shell A, which becomes integral with the layer 3 and preferably holds the components of the ball in a state of high compression.

Sawdust, ground rubber, or other material may be substituted for cork.

Having described my invention, I claim—

1. In a playing-ball, the combination with a sphere of yielding material, of a series of tense windings upon said sphere, a sphere thereon consisting of granulated substance incorporated with a derivative of pyroxylin, and a hard, springy cover.

2. In a playing-ball, the combination with a sphere of yielding material, of a series of metallic hoops or convolutions binding upon said sphere, a sphere thereon consisting of granulated substance incorporated with a derivative of pyroxylin, and a hard, springy cover.

3. In a playing-ball, the combination with a sphere consisting of granulated substance incorporated with pyroxylin, of a sphere of soft rubber, a metallic binding, and a cover of plastic material.

4. In a playing-ball, the combination with a sphere of yielding material, of a series of metal springs holding said sphere under compression, a layer of cork mixed with celluloid, and a celluloid cover upon said layer and integral therewith.

5. A playing-ball comprising a sphere of soft rubber, windings of tempered spring-wire, a sphere consisting of granulated substance mixed with pyroxylin, and a hard, plastic sphere.

In testimony whereof I have hereunto set my hand, at 9 to 15 Murray street, in the city of New York and State of New York, this 26th day of June, 1902.

FRANCIS H. RICHARDS.

Witnesses:
B. C. STICKNEY,
F. W. BARNACLO.